United States Patent [19]

Doty

[11] Patent Number: 4,609,096
[45] Date of Patent: Sep. 2, 1986

[54] LOADER/UNLOADER ASSEMBLY FOR VERTICAL STORES CONVEYOR HAVING UNLOAD POSITION SAFETY CUT-OFF

[75] Inventor: Verle L. Doty, Cincinnati, Ohio

[73] Assignee: Federal Equipment Company, Cincinnati, Ohio

[21] Appl. No.: 660,446

[22] Filed: Oct. 12, 1984

[51] Int. Cl.⁴ ............................................. B65G 17/34
[52] U.S. Cl. .................................. 198/464.4; 198/524; 198/634
[58] Field of Search ............... 198/796, 794, 365, 801, 198/856, 468, 483, 484, 524, 633, 637, 464.4, 360, 367, 474.1

[56] References Cited

U.S. PATENT DOCUMENTS

| | | | |
|---|---|---|---|
| 2,822,914 | 2/1958 | Barnett | 198/794 |
| 3,593,862 | 7/1971 | Pierson et al. | 198/856 X |
| 4,002,231 | 1/1976 | Doty | 198/796 X |
| 4,130,196 | 12/1978 | Schwab | 198/796 |
| 4,497,400 | 2/1985 | Otto et al. | 198/468 X |

Primary Examiner—Joseph E. Valenza
Assistant Examiner—Michael Stone
Attorney, Agent, or Firm—Frost & Jacobs

[57] ABSTRACT

A loader/unloader assembly for use with a vertical tiltable platform stores conveyor having a horizontal load position, a vertical stowed position and an intermediate inclined unload position. The load platform contains guide pins cooperating with a race track-shaped guide groove for selectably positioning the load platform in the three positions. When the load platform is in the unload position, a spring biased camming plate prevents displacement of one of the guide pins except upon application of a predetermined downward force to the load platform which serves to move the camming plate to an inhibit position and activate a switch to disconnect power from the conveyor system and stop conveyor movement. The force necessary to trigger the inhibit action may be selectably adjusted on the loader/unloader assembly.

10 Claims, 9 Drawing Figures

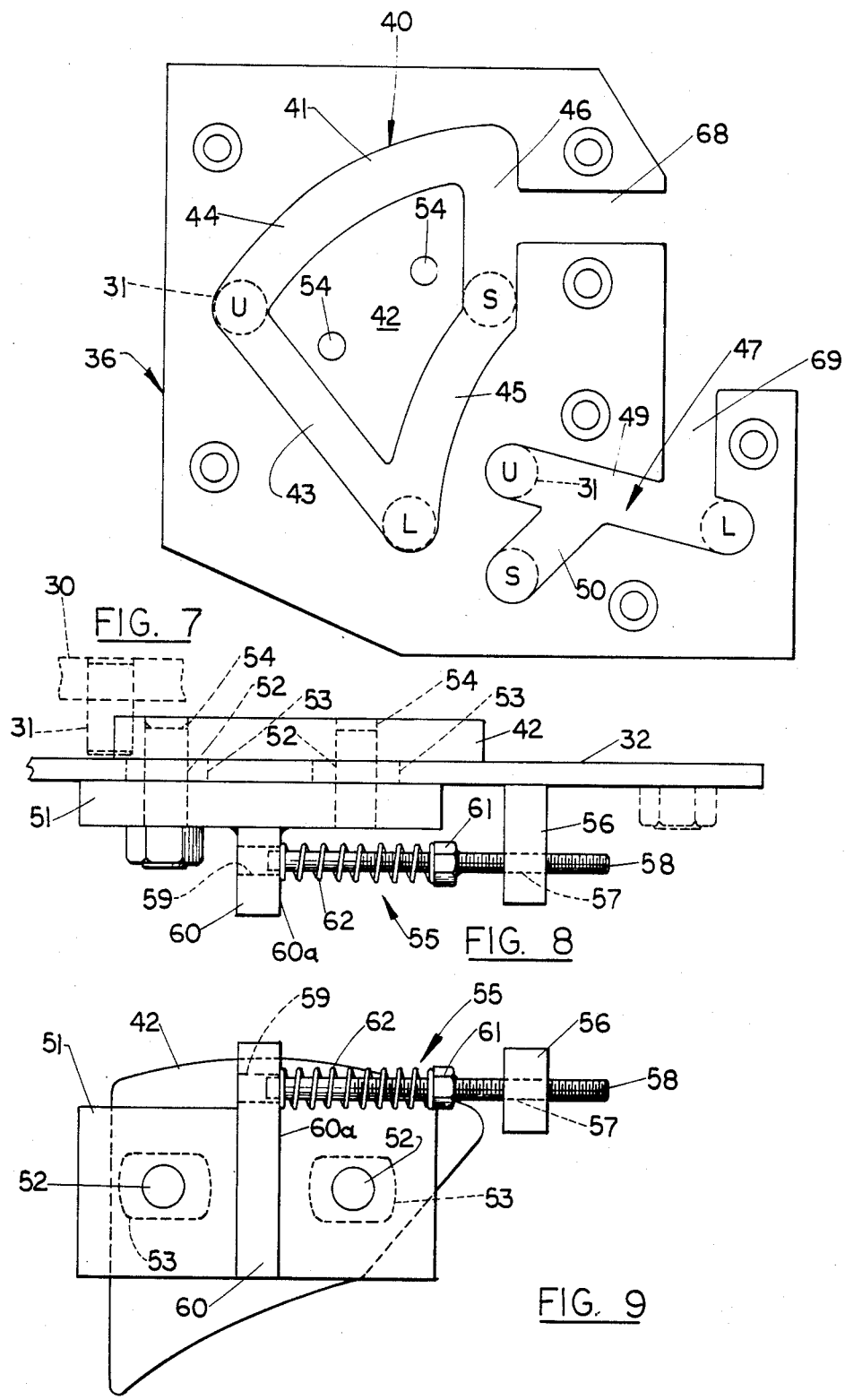

LOADER/UNLOADER ASSEMBLY FOR VERTICAL STORES CONVEYOR HAVING UNLOAD POSITION SAFETY CUT-OFF

SUMMARY OF THE INVENTION

The present invention is directed to mechanical apparatus for loading and unloading a vertical conveyor system of the type having a number of vertically spaced tiltable platforms or shelves for transferring objects between deck levels of naval vessels, for example.

Examples of such vertical stores conveyors are illustrated in U.S. Pat. Nos. 2,747,724, 3,365,052 and 3,854,570.

In a typical type of conveyor installation, a pair of horizontally spaced vertically oriented cam tracks extend between floors or decks for guiding rollers positioned on the sides of tiltable carrier tray assemblies. Each carrier tray assembly consists of a number of parallel spaced narrow fingers defining slots between the fingers.

The carrier tray assemblies are connected together by a pair of continuous chains which extend around upper and lower drive sprockets at the ends of conveyor travel.

In the usual type of conveyor system, there is provided a mechanism at one or both ends of conveyor travel which may operate to reorient the carrier tray assembly into a position where the fingers extend vertically.

A separate loader/unloader assembly is provided with the conveyor system for removing loads from or adding loads to the carrier tray assemblies. In the conventional type of installation, the loader/unloader assembly comprises a tray-like structure having a plurality of elongated parallel extending fingers which are spaced so that the fingers of the carrier tray assembly can pass between the fingers of the loader/unloader assembly. For transferring loads from the loader/unloader assembly to the vertical stores conveyor, the loader/unloader assembly bearing the load on its upper surface is placed in the horizontal position between upwardly moving carrier tray assemblies, where the load is picked off and conveyed upwardly. To transfer loads from the conveyor to the loader/unloader assembly, the loader/unloader assembly is placed in an inclined position between downwardly moving carrier tray assemblies, and the load deposited on the loader/unloader assembly as the fingers of the carrier tray assembly pass between adjacent fingers of the loader/unloader assembly.

In a system of this type, there is always the danger that objects may become trapped between a carrier tray assembly and the loader/unloader assembly resulting in damage to a load, personal injury, or damage to the conveyor or loader/unloader structure. To prevent this from occurring, loader/unloader assemblies are as a general rule provided with safety cut-offs which prevent downward movement of the carrier tray assemblies if the loading platform of the loader/unloader assembly is in a horizontal or loading position. Consequently, the conveyor can only move downwardly if the loading platform of the loader/unloader assembly is in the upwardly inclined unloaded position or is in the vertical stowed position.

Generally, the loader/unloader assembly is constructed so that the load platform may be placed in one of three positions. When a load is placed on the upper surface of the platform, the platform is placed in a horizontal position so that the fingers of the assembly are horizontal, thus enabling the upwardly moving carrier tray assembly fingers to pass between the fingers of the loader/unloader assembly and remove the load therefrom.

In the unload position, where a load is transferred from the conveyor by the loader/unloader assembly, the platform is placed upwardly in an inclined position. As a load is transferred from the downwardly moving carrier tray assembly to the loader/unloader assembly, the load platform remains fixed in the unload position.

Finally, the loader/unloader assembly may be provided with a stowed position where the platform is locked in a non-use vertical position. Locking the load platform in the vertical stowed position also serves to keep it out of the way of objects that might cause damage or injury.

Nonetheless, in some instances it is still possible for an object to become trapped between the load platform and the downwardly moving carrier tray assembly when the platform is in the unload position. For example, a small package may have insufficient size or weight and be positioned at the innermost ends of the load platform fingers in such a way that the load does not transfer out of the way of the next oncoming carrier tray. Under this condition, the package may become crushed between the moving carrier tray assembly and the unload platform.

To prevent this from happening, the present invention provides a sensing means associated with the loader/unloader assembly which automatically stops the conveyor in the event a predetermined downward force is applied against the load platform when it is in the unload position.

This is accomplished by providing the loader/unloader assembly with an unload position in which the loading platform assumes a stable position between the vertical stowed position and the horizontal load position. In the event a predetermined downward force is applied to the loading platform tending to displace it from the unload position, a switch is actuated which can be used to cut off power to the conveyor, thereby immediately stopping the movement of the conveyor tray assemblies. The force necessary to cause disablement is manually adjustable.

In a preferred embodiment of the invention, the loader/unloader assembly includes a load platform with a plurality of parallel extending elongated load supporting fingers spaced so that the fingers of the tray assemblies may pass therebetween. A pair of longitudinally spaced guide pins project outwardly from each side of the load platform.

The loader/unloader assembly is also provided with a cam plate mounted vertically on each side of the load platform with each of the plates being provided with guide grooves dimensioned to slidably engage the guide pins for positioning the load platform in the horizontal load position, the vertical stowed position, and the intermediate inclined unload position. These grooves define a generally trapezoidal-shaped first groove portion having a forward rearwardly and downwardly inclined groove section terminating at its upper and lower ends in upper and lower upwardly and rearwardly arcuate groove sections, respectively, connected by a rearward vertical groove section. One of the pins is slidingly engaged with the first groove portion so that it assumes a position at the juncture of the forward and lower groove sections when the load platform is in the unload position, a position at the juncture of the lower and rearward groove sections when the load platform is in the load position, and a position within the rearward groove section when the load platform is in the stowed position.

The groove also includes a second generally T-shaped groove portion having a rearwardly and downwardly inclined body groove section intersected intermediate its forward and rearward ends by a downwardly and forwardly inclined leg groove section. The other of the guide pins is slidingly engaged within the second groove portion such that the pin assumes a position at the forward end of the body groove section when the load platform is in the unload position, a position at the rearward end of the body groove section when the load platform is in the load position, and a position at the lower end of the leg groove section when the load platform is in the stowed position.

The first and second groove portions also include openings therewithin for removing the load platform entirely from the cam plates.

A jam block bearing a slidable camming plate is movably mounted adjacent the first groove portion so that a portion of the camming plate is operable to retain the associated pin at the juncture of the forward and lower groove sections when the load platform is in the unload position. The block and camming plate are movable to an inhibit position as the pin is moved along the forward groove section when a downward force is exerted against the load platform when in the unload position. Switch means are provided responsive to the jam block for preventing movement of the tray assemblies when the block is in the inhibit position. Manually adjustable means are provided for biasing the camming plate against the pin so that the block is movable to the inhibit position only upon the application of a predetermined downward force against the load platform.

The particular arrangement of the guide pins within the grooves also assures that the load platform may pivot freely upwardly from either the load or unload position in the event an upward force is applied against the bottom of the platform, for example by an object trapped between the load platform and an upwardly moving conveyor tray assembly.

As will become apparent from the detailed description which follows, the unique construction of the loader/unloader assembly of the present invention prevents damage or personal injury resulting from objects being trapped between the load platform of the loader/unloader assembly and the tray assemblies of the conveyor.

BRIEF DESCRIPTION OF THE DRAWING

FIG. 7 is a side elevation view of one of the cam plates associated with the loader/unloader assembly of the present invention illustrating the guide groove arrangement.

FIG. 8 is a fragmentary top plan view of the jam block and camming plate arrangement associated with the loader/unloader assembly of the present invention illustrating the manual tension adjustment.

FIG. 9 is a side elevation view of the apparatus of FIG. 8.

DETAILED DESCRIPTION

Figure 1:
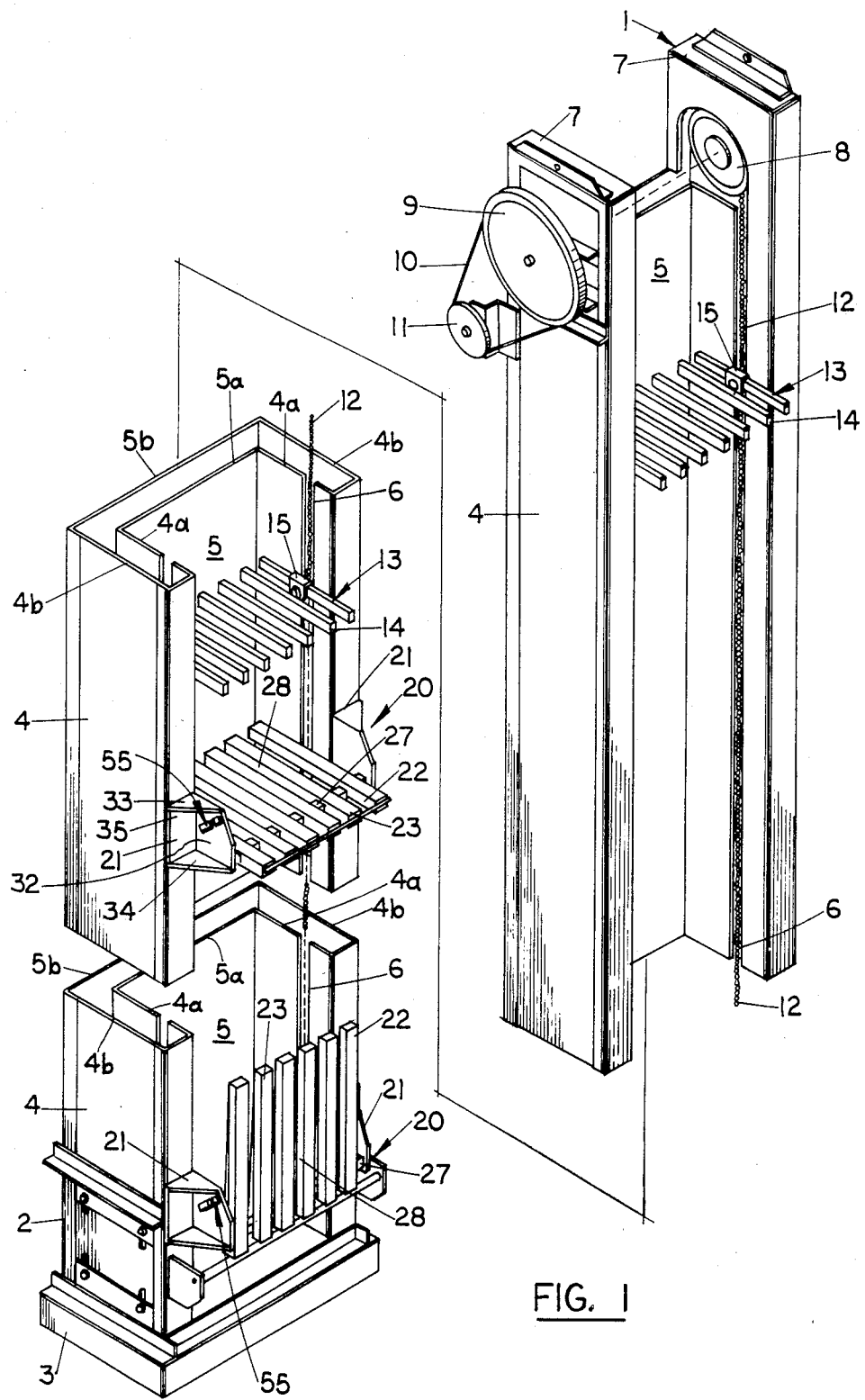
FIG. 1 is a fragmentary exploded front perspective view of a typical vertical stores conveyor system utilizing two loader/unloader assemblies of the present invention.

A conventional vertical stores conveyor system of the type commonly found aboard naval vessels or the like is illustrated generally at 1 in FIG. 1. Tailframe section 2 of conveyor 1 rests on a suitable foundation 3 which may be located, for example, on the lowermost material handling deck of a vessel.

A vertically extending frame section 4 extends upwardly from each tailframe section 2 the full height of the conveyor system. It will be understood that portions of the vertical frame sections have been removed in FIG. 1 for clarity. The vertically extending spaced parallel frame sections are connected along their rearmost edge by a vertical extending rear frame section 5. In the type of conveyor system illustrated in FIG. 1, frame sections 4 and 5 are of double-walled construction comprising inner walls 4a and 5a, and outer walls 4b and 5b, respectively.

Inner walls 4a are each provided with a centrally located vertically extending slot-like carrier tray assembly guiding cam track 6 which extends from tail sections 2 nearly to the upper end of the conveyor system.

Each of the upper ends of frame sections 4 is provided with a head frame section 7 which rotatably mounts a sprocket wheel, one of which is shown at 8. Sprocket 8 is connected by means not shown to a head drive sprocket 9 which is rotatably mounted to the opposite head frame section 7. Head drive sprocket 9 is connected by means of a belt, chain or the like 10 to a suitable motor 11 or other drive means. Motor 11 may be provided with means for rotating drive sprocket 9 in either direction, as well as means for removing drive power from the motor to stop its rotation as is well known in the art.

A continuous carrier chain 12 associated with each of frame sections 4 is looped about carrier sprocket 8 at the upper end of the conveyor 1, and also about a similar type of carrier sprocket (not shown) at the lower end of the conveyor system adjacent tailframe sections 2.

Conveyor 1 also includes a plurality of vertically-spaced carrier tray assemblies, two of which are illustrated at 13 in FIG. 1. It will be understood that as many carrier tray assemblies 13 may be provided as needed, spaced at appropriate vertical distances along the conveyor system.

Each carrier tray assembly 13 comprises a plurality of bar-like spaced parallel elongated load supporting fingers 14 which may be connected together to form a rigid structure by means not shown, but well understood in the art. The outermost fingers mount cam rollers 15 which are configured to ride within cam tracks 6 and are also fixedly connected to carrier chain 10.

It will be observed that this arrangement permits the carrier tray assemblies 13 to be moved upwardly or downwardly according to the direction of rotation of motor 11. In general, such vertical store conveyors are well known and may take other functionally equivalent forms.

The present invention is directed to a loader/unloader assembly, designated generally at 20 in FIG. 1, for placing a load onto the moving carrier tray assembly 13, or removing a load from the carrier tray assembly. For purposes of illustration, two loader/unloader assemblies 20 are illustrated in FIG. 1, one being located adjacent tail frame section 2 and shown in the stowed position as will be explained in more detail hereinafter, and the other positioned at an intermediate position on conveyor 1 and shown in the load position. However, any number of loader/unloader assemblies 20 may be used with conveyor 1, generally one such assembly per load/unload station. It will also be understood that loader/unloader assemblies may be affixed to frame sections 4 by means of mounting brackets 21 or the like.

Figure 2:
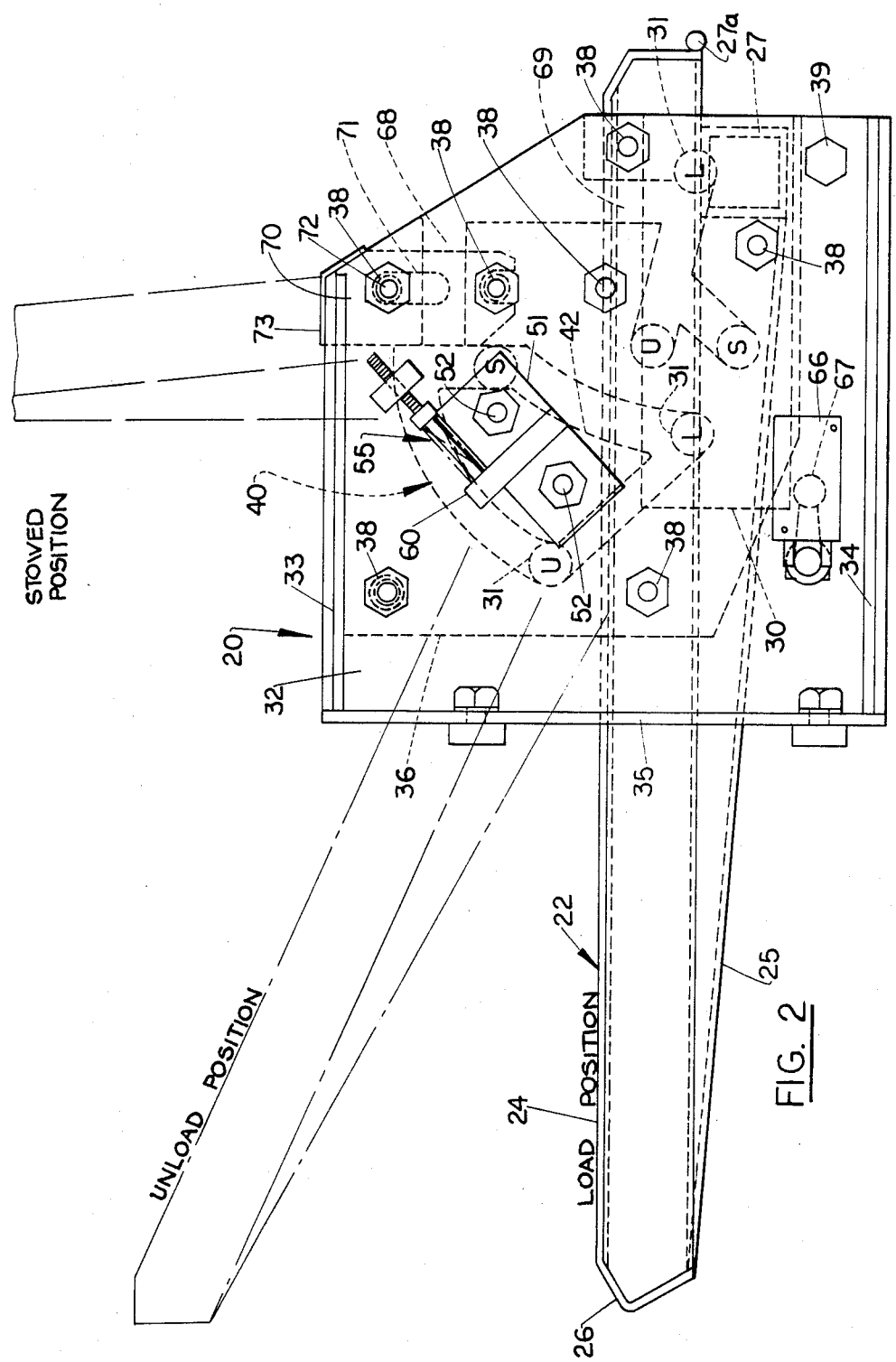
FIG. 2 is a fragmentary side elevation view of the loader/unloader assembly of the present invention illustrating the load platform in alternate unload and stowed positions.

Each loader/unloader assembly 20 includes a load platform 22 composed of a plurality of parallel extending elongated bar-like load supporting fingers, one of which is shown at 23. Fingers 23 may be constructed from rectangular tubing or the like, and may also be provided with rollers or skate wheels (not shown) as is well known in the art. As best shown in FIG. 2, each finger 23 is provided with an upper planar load bearing surface 24 which is substantially horizontal when load platform 22 is in the horizontal load position. The lower surface of fingers 23 extend rearwardly and downwardly as at 25. The forward end of each finger 23 is chisel-shaped as at 26.

The rearward ends of fingers 23 are connected together in spaced relationship with each other by a transversely extending bar-like bridging member 27 which may be constructed of square tubing, for example. Fingers 23 are spaced along bridging member 27 so that the spaces 28 between the fingers will permit the fingers 14 of carrier tray assemblies 13 to easily pass therebetween. A generally cylindrical stiffening rod 27a is fixedly attached to and bridges the rearmost ends of fingers 23.

Figure 3:
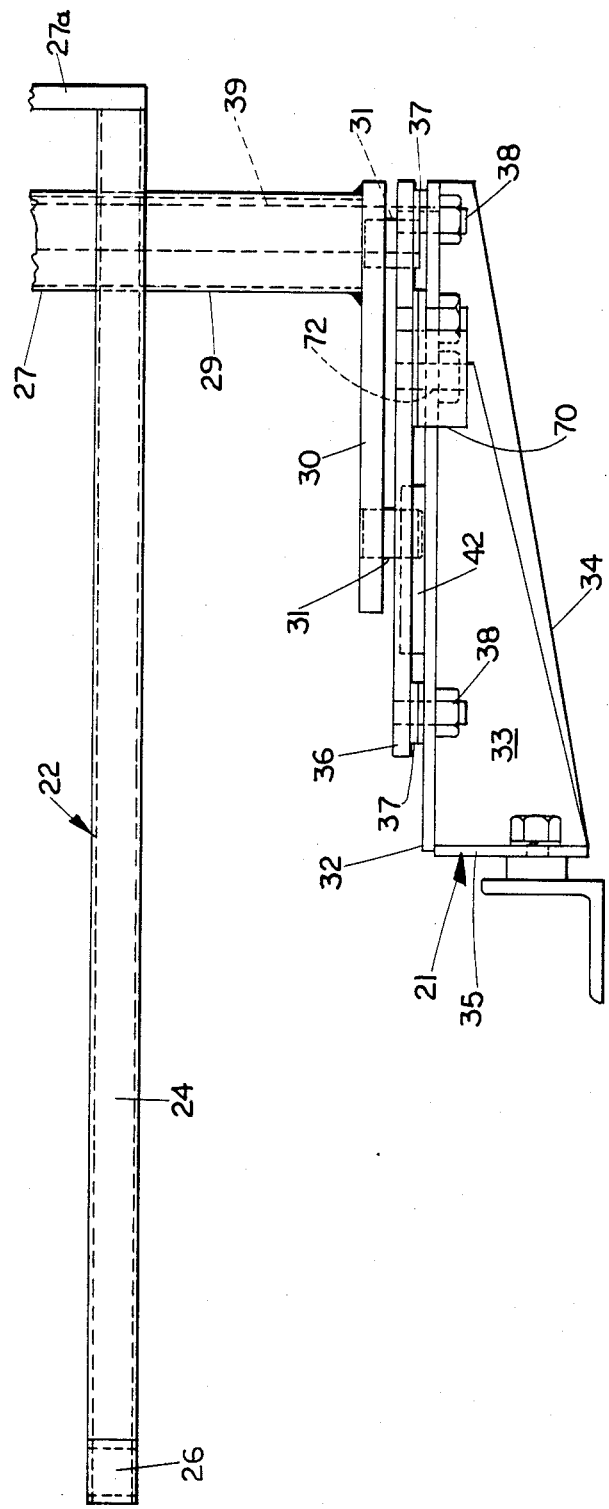
FIG. 3 is a fragmentary top plan view of the loader/unloader assembly of the present invention.

As best seen in FIG. 3, the outermost ends of bridging member 27 extend beyond the sides of the outermost finger 23 to form a supporting shaft section 29. The ends of shaft sections 29 are rigidly affixed to the rearward median portion of a vertically oriented generally rectangular loader platform plate 30.

A pair of longitudinally spaced generally cylindrical guide pins 31 project outwardly from the outside surface of each of loader platform plates 30. It will be observed, as best shown in FIG. 2, that pins 31 are vertically located at about the central longitudinal axis of fingers 23, so that they lie in a substantially horizontal plane when load platform 22 is in the horizontal load position.

Mounting bracket 21 is made up of a generally vertically extending mounting plate 32, an upper horizontally disposed triangular-shaped gusset member 33, and a lower horizontally disposed triangular-shaped gusset member 34. Gusset member 33 and 34 are rigidly attached to mounting plate 32, as well as to a second vertically oriented plate 35 which is attached to the front face of the supporting conveyor frame section 4.

There is mounted in spaced parallel relationship with the inner face of each of mounting plates 32 a generally flat loader cam plate 36. As can best be seen in FIG. 3, cam plate 36 is spaced inwardly from the inner surface of mounting plate 32 by interposed spacer washers 37. It will be observed that the upper boundaries of cam plate 36 are substantially co-terminous with the upper boundaries of mounting plate 32, while the forward and lower edges of the cam plate are spaced inwardly, respectively, of the corresponding boundaries of mounting plate 32. Plates 32 and 36 may be affixed together by bolts or the like 38. It will also be observed that the spacing of mounting brackets 21 may be maintained by a spreader bar 39 extending between and affixed to the lower rearward corners of mounting plates 32.

As best illustrated in FIG. 7, loader cam plate 36 is provided with a guide groove 40 dimensioned to slidingly engage cylindrical guide pins 31. As illustrated in FIG. 2, this permits load platform 22 to be positioned in a load position wherein the load platform is substantially horizontal, a stowed position wherein the load platform is substantially vertical, and an intermediate unload position wherein the load platform is angularly inclined.

As best shown in FIG. 7, guide groove 40 defines a generally trapezoidal-shaped first groove portion 41 which is formed by a trapezoidal-shaped cut-out in loader cam plate 36 together with a centrally located trapezoidal-shaped camming plate 42, which is held in place as will be described hereinafter.

First groove portion 41 is formed by a forward rearwardly and downwardly inclined groove section 43, which terminates at its upper and lower ends in upperwardly and rearwardly arcuate-shaped groove sections 44 and 45, respectively. The uppermost ends of upper and lower groove sections 44 and 45 are connected by a vertically extending rearward groove section 46.

The forwardmost one of guide pins 31 is slidingly engaged within first groove section 41 such that the guide pin assumes a position at the juncture of forward groove section 43 and upper groove section 44 (as designated by the guide position marked U) when load platform 22 is in the unload position. Similarly, fowardmost guide pin 31 assumes the position designated L at the juncture of lower groove section 43 and rearward groove section 45 when load platform 22 is in the load position. Finally, forwardmost guide pin 31 assumes the position marked S within vertical rearward groove section 46 when load platform 22 is in the stowed position, as illustrated in FIG. 2.

Guide groove 40 also includes a second generally T-shaped groove portion 47 which is located to the rear of and slightly below first groove portion 41. Second groove portion 47 includes a rearwardly and downwardly inclined body groove section 49 intersected intermediate its forward and rearward ends by a downwardly and forwardly inclined leg groove section 50.

The rearmost one of guide pins 31 is slidingly engaged within second groove portion 48 such that the pin assumes a position designated U at the forward end of body groove section 49 when the load platform 22 is in the unload position, a position designated L at the rearward end of body groove section 49 when load platform 22 is in the load position, and a position designated S at the lower end of leg groove section 50 when the load platform 22 is in the stowed position.

The present invention also includes means for inhibiting operation of conveyor 1 when load platform 22 is in the unload position and a downward force is applied against the load platform.

This means is formed by a generally rectangular plate-like jam block 51 which is movably mounted adjacent first groove portion 41. As illustrated in FIGS. 2, 8 and 9, jam block 51 is mounted on the outside face of left-hand mounting plate 32 such that the longitudinal axis of the jam block is inclined at an angle of about 45°. Jam block 51 is provided with a pair of longitudinally spaced inwardly directed generally cylindrical securing pins 52 which extend through elongated cooperating slots 53 in mounting plate 32 (see FIG. 9).

The innermost ends of securing pins 52 are press fitted into cooperating bores 54 in trapezoidal-shaped camming plate 42, thus operating to secure camming plate 42 in position to form guide groove 40 as previously described. Sufficient clearance is maintained between jam block 51, camming plate 42, and mounting plate 32 so that the jam block and camming plate are easily slidable as a unit and securing pins 52 are easily slidable within cooperating slots 53.

To maintain jam block 51 at a desired position, there is also provided a manually tension adjustment, shown generally at 55. Tension adjustment 55 comprises a rectangular support block 56 which is mounted to the outer surface of mounting plate 32 rearwardly and slightly above jam block 51. Support block 56 is provided with a threaded bore 57 which threadedly engages an elongated threaded shaft 58.

The opposite end of threaded shaft 58 is rotatably entrained within a transversely extending bore 59 extending completely through a generally rectangular bearing block 60 fixedly secured to and extending outwardly from the outer surface of jam block 51.

A hexagonal nut 61 is non-rotatably secured as by welding or the like to the medial portion of threaded shaft 58, and a compression spring 62 positioned on shaft 58 between nut 61 and the upper face 60a of bearing block 60. This arrangement serves to bias jam block 51 downwardly, with the tension exerted against bearing block 60 being adjustable through the rotation of adjustment nut 61.

In general, jam block 51 will be positioned so that the forwardmost corner of camming plate 42 contacts the outer surface of forwardmost guide pin 31 to restrain downward movement of the guide pin along forward groove section 43. The force which is exerted by camming plate 42 against the forwardmost guide pin is determined by the degree to which nut 61 associated with tension adjustment 55 is tightened or loosened. Consequently, when load platform 22 is in the unload position with the forwardmost guide pin restrained by the forward corner of cam plate 42, the amount of force applied downwardly against the load platform necessary to move camming plate 42, and hence jam block 51, upwardly to permit forward guide pin 31 to pass by the camming plate will be determined by the setting of tension adjustment 55. Consequently, the jam block is movable upwardly to a position designated as the inhibit position only upon the application of a predetermined downward force against the load platform 22 when the load platform is in the unload position.

Figure 4:
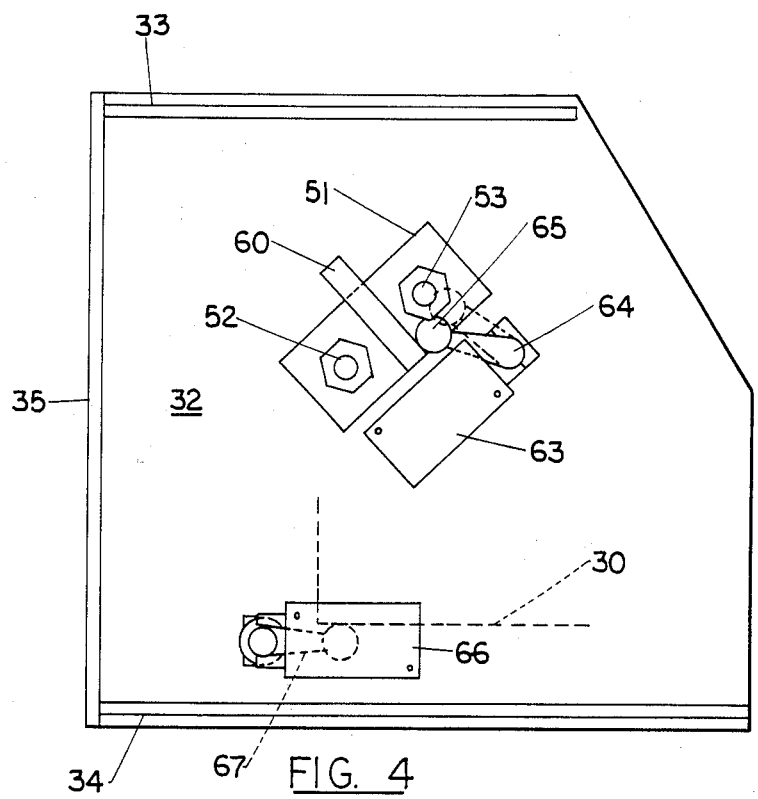
FIG. 4 is a side elevation view of the loader/unloader assembly of the present invention from which obscuring components have been removed to clearly illustrate the inhibit switch arrangements.

The electrical switching arrangement for inhibiting the movement of the tray assemblies 13 associated with conveyor 1 is illustrated in FIG. 4, where the tensioning adjustment 55 and other unrelated components have been removed for clarity. There is associated with jam block 51 an electrical switch 63 mounted to the outer surface of mounting plate 32 and provided with a toggle actuator arm 64. The generally spherical terminal end 65 of actuator arm 64 rests against the upper surface 60a of bearing block 61, and assumes the position illustrated in FIG. 4 when load platform 22 is in the normal load, unload or stowed position. Under this condition, switch 63 is closed, for example, and power will be supplied to motor 11 associated with conveyor 1 by means not shown so that carrier tray assemblies 13 may move in the upward or downward direction.

However, in the event that jam block 51 is displaced upwardly to its inhibit position, for example under the circumstances described hereinabove wherein a downward force is applied to the load platform 22 while in the unload position, the toggle actuator arm 64 will be displaced to the position shown in dashed lines in FIG. 4. This action will cause switch 63 to open, for example, so that electric power will be removed from motor 11, thereby preventing all downward movement of carrier tray assemblies 13. Thus there is provided a safety cut-off for the conveyor in the event that a downward force is applied to the load platform while in the unload position, such as might be caused by an object being trapped between the load platform and a tray assembly of the conveyor.

It will be understood that the inhibiting means just described may be located on each of mounting plate 32, except that only one of such means will include a switch 63.

A second automatic cut-off means is provided by an electrical switch 66 mounted to the outer surface of mounting plate 32 such that its toggle actuator arm 67 is normally biased to the position illustrated in FIG. 4 by the lower surface of loader platform plate 30 as designated schematically in FIG. 4. When switch arm 67 is in this position while load platform 22 is in the load position, the switch 66 will be opened, such that downward movement of the carrier tray assemblies 13 is inhibited by means well known in the art. Likewise, when load platform 22 pivots upwardly so that the lower surface of loader platform plate 30 no longer depresses the actuator arm 67 of switch 66, switch 66 will close, thereby permitting electric power to be supplied to motor 11. In this mode of operation, upward or downward movement of the carrier tray assemblies 13 will be permitted, also by means well known in the art.

Figures 5, 6:
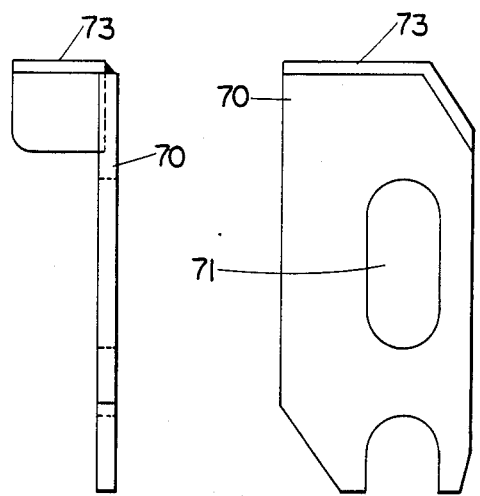
FIG. 5 is a side elevation view of the load platform keeper associated with the loader/unloader assembly of the present invention.
FIG. 6 is a front elevation view of the load platform keeper associated with the loader/unloader assembly of the present invention.

The loader/unloader assembly of the present invention also includes means for entirely removing load platform 22 from the remainder of the assembly. This is accomplished by means of an upper horizontally disposed disassembly groove section in loader cam plate 36 which communicates with rearward groove section 46, and a lower disassembly groove section 69 provided in loader cam plate 36 which communicates with body groove section 49. It will be observed that by tilting load platform upwardly, the forwardmost guide pin 31 may be removed through upper disassembly groove section 68, and thereafter the rearmost guide pin 31 may be removed from lower disassembly groove section 69, thus permitting the entire load platform to be removed from the loader/unloader assembly. In normal operation, however, an elongated load platform keeper 70, illustrated in FIG. 5 and FIG. 6 is removably secured to cover upper disassembly groove section 68 to pervent displacement of the forwardmost guide pin 31 from guide groove 40. Keeper 70 includes a longitudinally extending elongated slot 71. Keeper 70 is slidably secured to the outer face of mounting plate 32 by means of a nut and bolt 72 cooperating with slot 71. In order to permit removal of load platform 22, keeper 70 may be moved upwardly by grasping the outwardly extending flange 73 at the top of the keeper in order to provide clear passage for the forwardmost guide pin 31 through upper disassembly groove section 68.

In operation, in the event that the load platform 22 is in the load position, and the carrier tray assemblies 13 are moving upwardly, any type of jam condition will cause the load platform to pivot upwardly such that the forwardmost guide pin 31 slides upwardly within lower groove section 45, thus permitting any object located on the carrier tray assembly to slide past the underside of the load platform.

Likewise, if the load platform is in the unload position and the carrier tray assemblies are moving upwardly, a jam condition will cause forwardmost guide pin 31 to slide rearwardly within upper groove section 44, thereby permitting the load platform to pivot upwardly.

In the event a jam condition occurs while the load platform is in the unload position and the carrier tray assemblies are moving downwardly, jam block 51 will be displaced as previously described to inhibit conveyor operation. The force necessary to displace jam block 51 to the inhibit position is governed by the setting of the adjustment nut 60 associated with tension assembly 55 as previously described.

Finally, load platform may be manually moved to the stowed position wherein the load platform is vertical by pivoting the load platform upwardly such that the rearmost guide pin 31 drops into leg groove section 50. The load platform may be removed from the stowed position by lifting up on the platform to displace the rearmost guide pin from leg groove section 50, and causing the rearmost pin to become captured at either the forward or rearward end of body groove section 49, depending upon whether the load platform is in the unload or load position as previously described.

It will be understood that various changes in the steps, details, materials and arrangements of parts, which have been herein described and illustrated in order to explain the nature of the invention, may be made within the principle and scope of the invention as expressed in the appended claims.

The embodiments of the invention in which an exclusive property or privilege is claimed are as follows:

1. A loader/unloader assembly for use with a vertical conveyor system comprising a tiltable load platform, means for positioning said platform to a horizontal load position and to an inclined unloaded position, said positioning means comprising guide pin means associated with said platform and guide groove means cooperating with said guide pin means for selectively positioning the load platform in said load and unloaded positions, said guide pin means comprising first and second spaced guide pins slidingly cooperating with said guide groove means, said guide groove means being operable to permit upward pivotal movement of said load platform in the load and unloaded positions, said guide groove means comprising a first substantially closed groove portion for slidably engaging said first guide pin and a second groove portion for slidably engaging said second guide pin, said positioning means including means associated with said guide groove means for selectively positioning the load platform in a vertical stowed position, said first groove portion comprising a forward, rearwardly and downwardly inclined groove section terminating at its upper and lower ends in upwardly and rearwardly arcuate groove sections, respectively, connected by a rearward vertical groove section, said first pin being slidably engaged with said first groove portion such that it assumes a position at the juncture of said forward and upper groove sections when the load platform is in the unloaded position, a position at the juncture of said lower and rearward groove sections when the load platform is in the load position, and a position within said rearward groove section when the load platform is in the stowed position, said groove also including a second generally T-shaped groove portion having a rearwardly and downwardly inclined body groove section intersected intermediate its forward and rearward ends by a downwardly and forwardly inclined leg groove section, said second guide pin being slidably engaged with said second groove portion such that said second pin assumes a position at the forward end of said body groove section when the load platform is in the unloaded position, a position at the rearward end of said body groove section when the load platform is in the load position, and a position at the lower end of said leg groove section when the load platform is in the stowed position, means for sensing when a predetermined downward force is applied to the load platform in the unload position, means for inhibiting conveyor operation when said predetermined force is sensed, means for retaining said first pin at the juncture of said forward and upward groove sections when the load platform is in the unload position, said retaining means being displaceable to an inhibit position when said predetermined force is applied to the load platform, said inhibit means being responsive to the displacement of said retaining means to said inhibit position, means for adjustably urging said retaining means against said first pin so as to vary the force applied against the load platform necessary to displace the retaining means to the inhibit position, said retaining means comprising block means extending slightly into said first groove portion so as to displaceably hold the first pin in place when the load platform is in the unload position, and means for slidably mounting said block means for movement toward and away from said first pin, said urging means comprising spring means for urging said block means against said first pin, said inhibit means comprising switch means responsive to said block means for producing a change in the state of an electric signal when said block means is displaced to the inhibit position.

2. The apparatus according to claim 1 wherein said platform comprises a plurality of parallel extending load supporting fingers spaced so as to permit the fingers of vertically movable tray assemblies associated with the conveyor system to pass therebetween.

3. The apparatus according to claim 1 including means for positioning said platform to a vertical stowed position, said platform in the unload position assuming an inclined position between said load and stowed positions.

4. The apparatus according to claim 1 wherein each of said groove portions includes openings therewithin for removing the associated pin completely from the guide groove such that the load platform may be removed from the loader/unloader assembly.

5. The apparatus according to claim 1 wherein said sensing means comprises means for retaining the load platform in said unload position, said retaining means being displaceable to an inhibit position when said predetermined force is applied to the load platform, said inhibit means being responsive to displacement of said retaining means to said inhibit position.

6. The apparatus according to claim 5 including means for adjustably urging said retaining means against said load platform so as to vary the force applied against the load platform necessary to displace the retaining means to the inhibit position.

7. The apparatus according to claim 6 wherein said retaining means comprises displaceable block means for holding the load platform in the unload position, means for slidably mounting said block means for movement toward and away from said load platform, wherein said urging means comprises spring means for urging said block means against said load platform and said inhibit means comprises switch means responsive to said block means for producing a change in state of an electrical signal when said block means is displaced to the inhibit position.

8. A loader/unloader assembly for use with a vertical conveyor system having a plurality of vertically-spaced carrier tray assemblies mounting a plurality of spaced parallel elongated load supporting fingers, a pair of spaced vertically extending frame sections having tracks for slidably supporting the sides of the carrier tray assemblies, and a motor driven continuous chain attached to the tray assemblies for vertically moving the tray assemblies in upward and downward directions along the tracks, said loader/unloader assembly comprising:

a pivotally mounted load platform including a plurality of parallel extending elongated load supporting fingers spaced so that the fingers of the tray assemblies may pass therebetween;

a pair of longitudinally spaced guide pins projecting outwardly from each side of said load platform;

a cam plate mounted vertically on each side of said load platform, each of said plates being provided with guide grooves dimensioned to slidingly engage said guide pins for positioning said load platform in a horizontal load position, a vertical stowed position, and an intermediate inclined unload position, said grooves defining a generally trapezoidal-shaped first groove portion having a forward rearwardly and downwardly inclined groove section terminating at its upper and lower ends in upper and lower upwardly and rearwardly arcuate groove sections, respectively, connected by a rearward vertical groove section, one of said pins being slidingly engaged within said first groove portion such that it assumes a position at the juncture of said forward and upper groove sections when the load platform is in the unload position, a position at the juncture of said lower and rearward groove sections when the load platform is in the load position, and a position within said rearward groove section when the load platform is in the stowed position, and a second generally T-shaped groove portion having a rearwardly and downwardly inclined body groove section intersected intermediate its forward and rearward ends by a downwardly and forwardly inclined leg groove section, the other of said guide pins being slidably engaged within said second groove portion such that said pin assumes a position at the forward end of said body groove section when the load platform is in the unload position, a position at the rearward end of said body groove section when the load platform is in the load position, and a position at the lower end of said leg groove section when the load platform is in the stowed position;

a camming plate slidably mounted adjacent said first groove portion such that a portion of said camming plate operates to retain said pin at the juncture of the forward and lower groove sections when the load platform is in the unload position, said camming plate being movable to an inhibit position as said pin is moved along said forward groove section when a predetermined downward force is exerted against the load platform when in the unload position;

means for adjustably urging said camming plate against said pin such that the camming plate is movable to said inhibit position only upon the application of a predetermined downward force against the load platform; and switch means responsive to said camming plate for preventing movement of said tray assemblies when the camming plate is in said inhibit position, whereby trapping of objects between said load platform and tray assemblies may be prevented.

9. The apparatus according to claim 8 including a generally vertically oriented plate bearing said guide groove, said camming plate being slidably retained on one side of said vertical plate, a jam block slidable with said camming plate, said urging means comprising rotatable screw means having one end threadably engaging said vertical plate and the other end bearing against said jam block, and a compression spring surrounding said screw means and being compressed between said jam block and vertical plate, rotation of said screw means varying the force exerted by said spring against said jam block.

10. The apparatus according to claim 9 including said conveyor system and means for attaching said loader/unloader assembly to said frame sections.

* * * * *